United States Patent
Gutierrez et al.

(10) Patent No.: US 12,267,435 B2
(45) Date of Patent: Apr. 1, 2025

(54) CRYPTOCURRENCY MINER AND STATISTICAL BUILT-IN SELF TESTS

(71) Applicant: Chain Reaction Ltd., Yokneam (IL)

(72) Inventors: Rony Gutierrez, Pardes Hanna-Karkur (IL); Michael Tal, Yoqneam Illit (IL); Zvi Shteingart, Moscow (RU)

(73) Assignee: CHAIN REACTION LTD., Yokneam (IL)

( * ) Notice: Subject to any disclaimer, the term of this patent is extended or adjusted under 35 U.S.C. 154(b) by 181 days.

(21) Appl. No.: 17/884,354

(22) Filed: Aug. 9, 2022

(65) Prior Publication Data

US 2024/0056307 A1   Feb. 15, 2024

(51) Int. Cl.
*H04L 9/32* (2006.01)
*H04L 9/00* (2022.01)

(52) U.S. Cl.
CPC .............. *H04L 9/3236* (2013.01); *H04L 9/50* (2022.05)

(58) Field of Classification Search
CPC ..... H04L 9/3236; H04L 9/50; H04L 2209/56; H04L 9/3239
See application file for complete search history.

(56) References Cited

U.S. PATENT DOCUMENTS

| | | | | |
|---|---|---|---|---|
| 10,939,405 | B1* | 3/2021 | Haleem | H04L 9/3239 |
| 11,907,029 | B2* | 2/2024 | Barbour | G06F 1/20 |
| 2016/0164672 | A1* | 6/2016 | Karighattam | H04L 9/0643 380/28 |
| 2020/0082390 | A1* | 3/2020 | Mursalov | G06Q 50/01 |
| 2020/0186607 | A1 | 6/2020 | Murphy et al. | |
| 2020/0264688 | A1 | 8/2020 | Harms | |
| 2020/0264689 | A1 | 8/2020 | Harms | |
| 2020/0311697 | A1* | 10/2020 | Keys | H04L 9/3236 |

(Continued)

FOREIGN PATENT DOCUMENTS

| WO | 2015077378 A1 | 5/2015 |
|---|---|---|
| WO | WO-2019226765 A1 * | 11/2019 |

OTHER PUBLICATIONS

"AsicBoost—A Speedup for Bitcoin Mining", Dr. Timo Hanke, Mar. 31, 2016, 10 pages.

(Continued)

*Primary Examiner* — Joseph P Hirl
*Assistant Examiner* — Thomas A Gyorfi
(74) *Attorney, Agent, or Firm* — McAndrews, Held & Malloy, Ltd.

(57) ABSTRACT

A cryptocurrency miner includes compute modules and a controller. Each compute module includes a stats store, a manager, and compute engines. The controller is coupled to the compute modules via a serial bus and distributes one or more jobs to the compute modules via the serial bus. Each manager distributes jobs received by its respective compute module among the compute engines of its respective compute module. Each compute engine processes a job and reports a candidate hit found by processing the job. Each manager validates a candidate hit reported by one of the compute engines of its respective compute module, reports the validated candidate hit to the controller; and updates statistical information in the stats store of its respective compute module based on validation of the candidate hit.

20 Claims, 5 Drawing Sheets

(56) References Cited

U.S. PATENT DOCUMENTS

2020/0403984 A1* 12/2020 Minehan .............. H04L 9/3247

OTHER PUBLICATIONS

"Crypto Mining: Network Difficulty, Share Difficulty and Hash Functions", Luxor Tech, Feb. 20, 2020, 6 pages.
"Mastering Bitcoin", Andreas M. Antonopoulos, Published by O'Reilly Media, Inc. 2010, 87 pages.
Federal Information Processing Standards Publication, Aug. 2015, 36 pages.
"Optimising the SHA256 Hashing Algorithm for Faster and More Efficient Bitcoin Mining", Rahul P. Naik, Department of Computer Science, University College of London, Sep. 2, 2013, 65 pages.
BitmainAntminer—Youtube video, https://www.youtube.com/watch?v=_R36wWMM34M.
MicroBT Whatsmainer—Youtube video, https://www.youtube.com/watch?v=6vtq1m8w5eQ.
SHA-256 The Center Of Bitcoin—Andreas M. Antonopoulos—Youtube video, https://www.youtube.com/watch?v=TvqDbLnsSNs.
International Search Report and Written Opinion for Appln No. PCT/IB1012/055944, mailed Sep. 28, 2023, 9 pages.

* cited by examiner

CRYPTOCURRENCY MINER AND STATISTICAL BUILT-IN SELF TESTS

BACKGROUND

Cryptocurrency is a digital asset designed to work as a medium of exchange. Individual coin ownership records are stored in a ledger or blockchain. Unlike conventional currencies, cryptocurrency does not typically exist in a physical form and is typically not issued by a central authority.

A blockchain provides a continuously growing list of records, called blocks, which are linked and secured using cryptography. Each block typically contains a hash pointer as a link to a previous block, a timestamp, and transaction data. By design, blockchains are inherently resistant to modification of the data. A blockchain is typically managed by a peer-to-peer network collectively adhering to a protocol for validating new blocks. Once recorded, the data in any given block cannot be altered retroactively without the alteration of all subsequent blocks, which requires collusion of the network majority.

In cryptocurrency networks, miners validate cryptocurrency transactions of a new candidate block for the blockchain via a Proof-of-Work algorithm. A side effect of validating the candidate block is the creation of newly minted cryptocurrency. The newly minted cryptocurrency as well as associated service fees are awarded to the miner that was the first miner to validate the candidate block and thus complete the Proof-of-Work algorithm.

This winner-takes-all compensation scheme has created an arms race for more efficient miners. Furthermore, mining pools have developed in an attempt to lessen the risks associated with the winner-takes-all compensation scheme. Miners or members of a mining pool share their processing power and split any obtained reward among the members according to the amount of work they contributed.

Limitations and disadvantages of conventional and traditional cryptocurrency mining approaches will become apparent to one of skill in the art, through comparison of such approaches with the present disclosure as set forth in the remainder of the present disclosure with reference to the drawings.

SUMMARY

Figure 1:
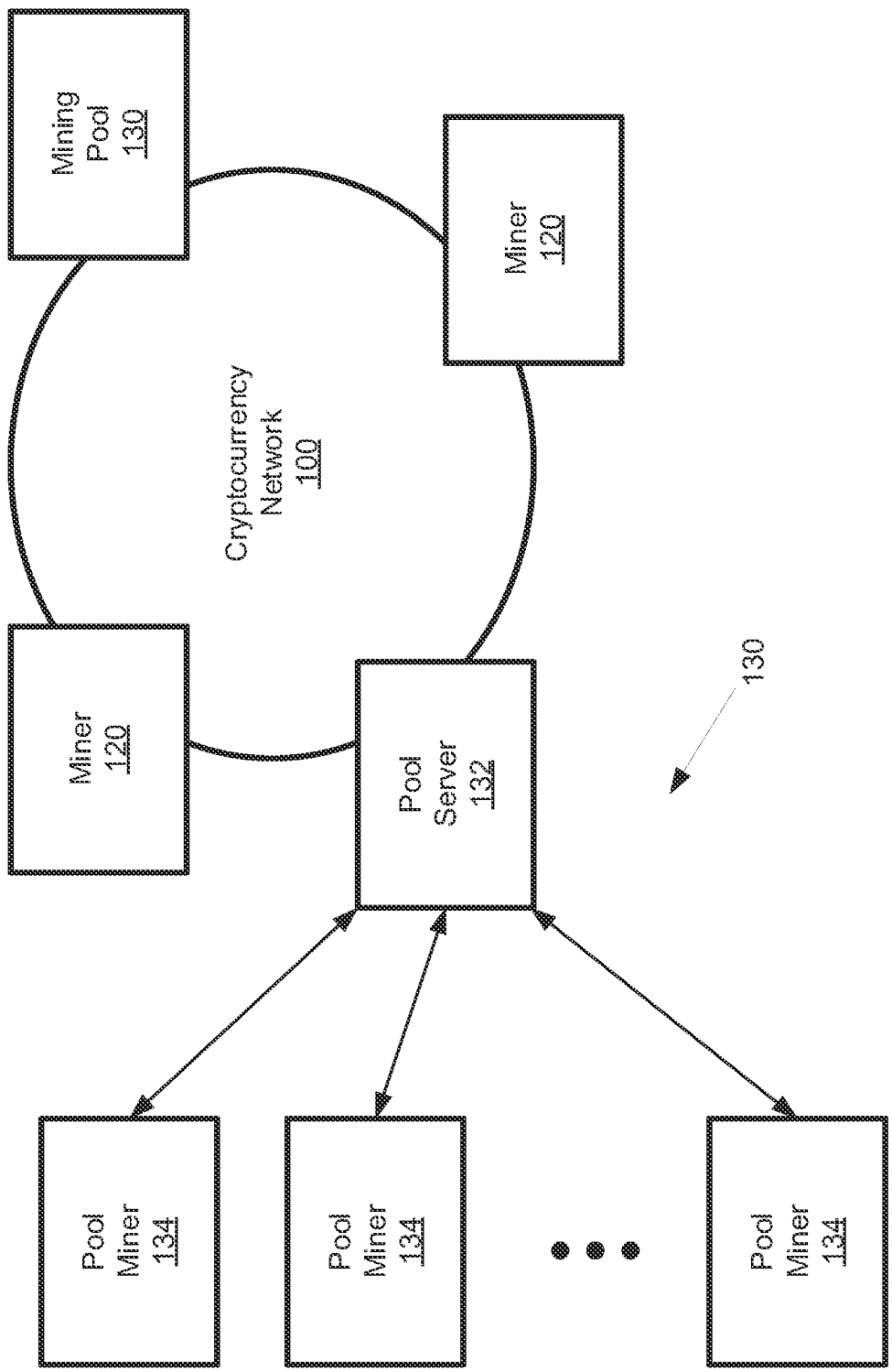
FIG. 1 shows a cryptocurrency network comprising miners in accordance with various aspects of the present disclosure.

Cryptocurrency miners and associated methods and apparatus are substantially shown in and/or described in connection with at least one of the figures, and are set forth more completely in the claims.

Advantages, aspects, and novel features of the present disclosure, as well as details of illustrated embodiments, will be more fully understood from the following description and drawings.

DETAILED DESCRIPTION OF VARIOUS ASPECTS OF THE DISCLOSURE

Various aspects of the present disclosure are presented by way of example. Such examples are non-limiting, and thus the scope of various aspects of the present disclosure should not necessarily be limited by any particular characteristics of the provided examples. In the following, the phrases "for example," "e.g.," and "exemplary" are non-limiting and are generally synonymous with "by way of example and not limitation," "for example and not limitation," and the like.

As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y and/or z" means "one or more of x, y, and z."

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component, or a first section could be termed a second element, a second component, or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example a component may be turned sideways so that its "top" surface is facing horizontally and its "side" surface is facing vertically, without departing from the teachings of the present disclosure.

In the drawings, various dimensions (e.g., thicknesses, widths, lengths, etc.) may be exaggerated for illustrative clarity. Additionally, like reference numbers are utilized to refer to like elements through the discussions of various examples.

The discussion will now refer to various example illustrations provided to enhance the understanding of the various aspects of the present disclosure. It should be understood that the scope of this disclosure is not limited by the specific characteristics of the examples provided and discussed herein.

Referring now to FIG. 1, an embodiment of a cryptocurrency network 100 is shown. In particular, the cryptocurrency network 100 may be implemented as a Bitcoin network. The present disclosure focuses primarily upon Bitcoin and the Bitcoin network. However, aspects of the present disclosure are also applicable to other cryptocurrencies, also referred to as Altcoin, such as, for example, Litecoin, Dogecoin, Ethereum, etc. and their respective networks. Similarly, the present disclosure focuses primarily on aspects of mining pool miners that are members of a Bitcoin mining pool. However, aspects of the present disclosure are also applicable to standalone miners, distributed miners, and/or mining pool miners of Bitcoin and/or Altcoin networks.

As shown, the cryptocurrency network 100 may include multiple miners 120 (e.g., standalone miners and/or distributed miners) and multiple mining pools 130, which are operably coupled to one another via various networks such as LANs, WANs, cellular, satellite, and/or communication networks. The miners 120 and mining pools 130 of the cryptocurrency network 100 compete with each other in a decentralized manner to create a new block of processed Bitcoin transactions (e.g., transfers of Bitcoin between parties), and add the newly created block to the blockchain for the cryptocurrency network 100.

The blockchain is essentially a growing list or ledger of cryptographically linked records of transactions called blocks. Each block includes a cryptographic hash of the previous block, a timestamp, transaction data, and potentially other fields. The blocks form a chain, with each additional block reinforcing the ones before it. As such, blockchains are resistant to modification because any given block cannot be altered retroactively without altering all subsequent blocks.

The creation of a new block is designed to be computationally intensive so as to require the cryptocurrency network 100 to spend a specified amount of time on average to create a new block. For example, the Bitcoin network is designed to create and add a new block to the blockchain every 10 minutes on average. The cryptocurrency network 100 periodically adjusts the computational difficulty of creating a new block to maintain the 10 minute target. In this manner, the cryptocurrency network 100 may create new blocks in a relatively steady manner despite ever changing computational capacity. For example, adding new miners 120, mining pool miners 134, and/or mining pools 130 to the cryptocurrency network 100 increases the overall computational capacity of the cryptocurrency network 100. Such increased computational capacity reduces the time required to create and add a new block to blockchain. However, the cryptocurrency network 100 periodically adjusts the computational difficulty of creating a new block to maintain the 10 minute target. As a result, the cryptocurrency network 100 eventually detects that blocks are being created at a rate faster than the 10 minute target and appropriately increases the difficulty of creating a new block so as to counteract the increased computational capacity and maintain the roughly 10 minutes per block average.

To incentivize parties to undertake the computationally difficult task of generating a new block, the cryptocurrency network 100 compensates the miners 120 and mining pools 130 for their efforts. In particular, each new block generates a quantity of new currency (e.g., 6.25 Bitcoins) as well as service fees from all transactions in the block. These new coins and service fees are awarded to the first entity (e.g., miner 120 or mining pool 130) that solves the Proof-of-Work algorithm for the next block to be added to the blockchain. The Proof-of-Work algorithm is essentially a computationally intensive process that creates a new block that satisfies a cryptographic hash target. Thus, the miners 120 and mining pools 130 are in competition with one another since only the first entity to solve the Proof-of-Work algorithm receives the associated block award.

Given the all or nothing nature of the block awards, mining pools 130 have formed. In general, a mining pool 130 includes a pool server 132 and several mining pool miners or members 134. The pool server 132 divides the Proof-of-Work into substantially smaller jobs and distributes such smaller jobs to the mining pool miners 134 in the mining pool 130. By completing smaller jobs, mining pool miners 134 obtain shares of a block award won by the mining pool 130. In this manner, each of the mining pool miners 134 may earn a smaller award (e.g., a share of a block award proportional to their contribution to completing the Proof-of-Work) on a more frequent basis than if each of the mining pool miners 134 were operating as a miner 120 on its own.

Figure 2:
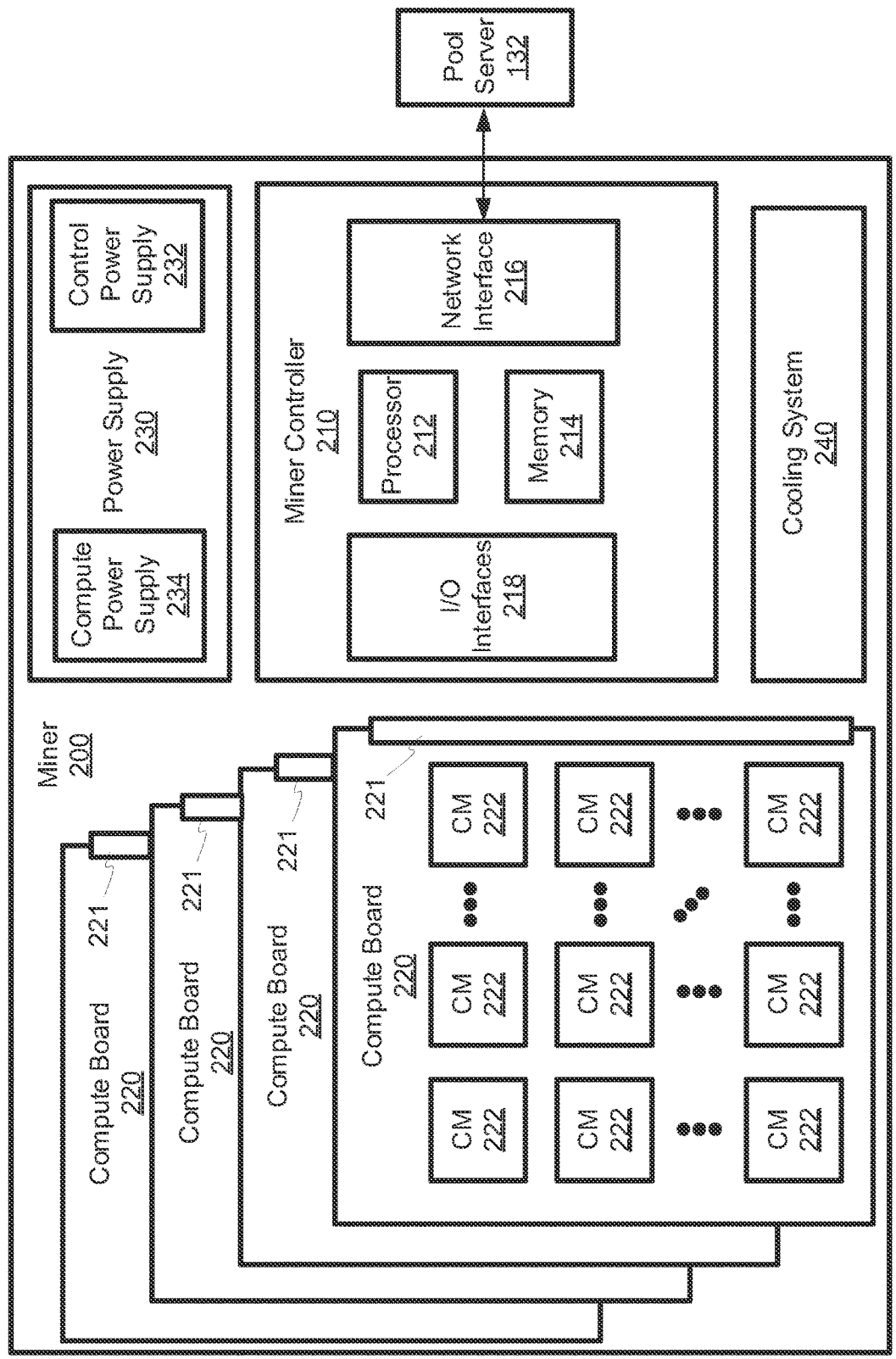
FIG. 2 shows a block diagram of a miner of FIG. 1.

A block diagram of a miner 200 is shown in FIG. 2, which is suitable for implementing one of the mining pool miners 134 of the mining pool 130. As shown, the miner 200 includes a miner controller 210, compute boards 220, a power supply 230, and a cooling system 240.

The miner controller 210 generally manages the components of the miner 200. In particular, the miner controller 210 interacts with pool server 132 on the behalf of the compute boards 220. To this end, the miner controller 210 obtains jobs from the pool server 132, distributes the jobs to the compute boards 220, and submits Proof-of-Work to the pool server 132 for the jobs completed by the compute boards 220.

As shown, the miner controller 210 may include a processor 212, memory 214, a network interface 216, and various input/output (I/O) interfaces 218. The processor 212 may be configured to execute instructions, manipulate data, and generally control operation of the other components of the miner 200 as a result of its execution. To this end, the processor 212 may include a general-purpose processor such as an x86 processor or an ARM processor, which are available from various vendors. However, the processor 212 may also be implemented using an application specific processor, programmable gate arrays, and/or other logic circuitry.

The memory 214 may store instructions and/or data to be executed and/or otherwise accessed by the processor 212. In some embodiments, the memory 214 may be completely and/or partially integrated with the processor 212. The memory 214 may store software and/or firmware instructions, which may be executed by processor 212. The memory 214 may further store various types of data which the processor 212 may access, modify, and/or otherwise manipulate in response to executing instructions from memory 214. To this end, the memory 214 may comprise volatile and/or non-volatile storage devices such as random-access memory (RAM) devices, read only memory (ROM) devices, flash memory devices, solid state device (SSD) drives, etc.

The network interface 216 may enable the miner 200 to communicate with other computing devices such as the pool server 132. In particular, the network interface 216 may permit the processor 212 to obtain jobs from the pool server 132 and submit completed jobs to the pool server 132. To this end, the networking interface 216 may include a wired networking interface such as an Ethernet (IEEE 802.3) interface, a wireless networking interface such as a WiFi (IEEE 802.11) interface, a radio or mobile interface such as a cellular interface (GSM, CDMA, LTE, 5G, etc.), and/or some other type of networking interface capable of providing a communications link between the miner 200 and other devices such as the pool server 132.

Finally, the I/O interfaces 218 may generally provide communications and control paths between the processor 212 and other components of the miner 200 such as the compute boards 220, power supply 230, and cooling system 240. Via such interfaces, the processor 212 may control the operation of such components. For example, the processor 212 may use such I/O interfaces 218 to initialize the compute boards 220, distribute jobs to the compute boards 220, receive completed jobs from the compute boards 220, selectively enable/disable the power supply 230, and selectively turn on/off cooling system 240, among other things.

In various embodiments, the one or more I/O interfaces 218 include communication interfaces such as a Serial Peripheral Interface (SPI) interface and/or an Inter-Integrated Circuit (I2C) interface via which the processor 212 may communicate with the compute boards 220. In particular, each compute board 220 may include a board connector and/or communication interface 221. A bus such as, for example, a four-wire SPI serial bus may connect the compute modules 222 of the compute boards 220 to the miner controller 210 via the board connector 221 and their respective SPI interfaces. In such an embodiment, the miner controller 210 and compute modules 222 may operate in a master-slave arrangement, wherein the miner controller 210 acts as the single master of the bus and each of the compute modules 222 operate as slaves on the bus. In such embodiments, the miner controller 210 may assign jobs to the compute modules 222 and the compute modules 222 may push completed jobs to the miner controller 210 upon completion. In various embodiments, the miner controller 210 and compute modules 222 may utilize an SPI interface and associated SPI bus segments to communicate. However, other interconnect technologies may be used in other embodiments.

Each compute board 220 may include a board connector 221 and several compute modules 222 coupled to the board connector 221 via one or more bus segments. Each compute module 222, likewise, may include several compute engines that perform computational aspects of completing a job. In various embodiments, each compute module 222 is implemented via an application specific integrated circuit (ASIC). However, the compute modules 222 and their respective compute engines may be provided by other forms of circuitry such as field programmable gate arrays (FPGAs).

In various embodiments, a miner 200 may include 4 compute boards, each compute board 220 may include 28 compute modules 222, and each compute module 222 may include 12 compute engines. Thus, such a miner 200 may provide 1,344 (4×28×12) compute engines. The above quantities of compute boards 220, compute modules 222, and compute engines are provided merely for context. Other embodiments of the miner 200 may include different quantities of such components.

Per the Bitcoin standard, a candidate block header must have a message digest or hash value that satisfies a current target value in order to be deemed a valid block header suitable for adding to the blockchain. Such a message digest is computed per a double SHA256 hash of the block header. Specifically, a compute engine generates a double SHA256 hash of a candidate block header by computing a first message digest or hash value of the candidate block header per the SHA256 algorithm specified by Federal Information Processing Standards Publication 180-4 (FIPS Pub. 180-4). The compute engine then computes a second message digest or final hash value of the candidate block header by performing a SHA256 hash of the first message digest. Thus, the compute engine performs a double hash of the candidate block header to determine whether its double hash value satisfies a target value and is therefore a valid block header. Thus, for Bitcoin and various Altcoin embodiments of the miner 200, the compute boards 220 may also be referred to as hashing boards 220 since the compute engines perform various hashing functions and/or various cryptographic algorithms addressing a similar goal as such hashing functions.

While Bitcoin and some other cryptocurrencies utilize the SHA256 hashing algorithm as part of their Proof-of-Work algorithms, other cryptocurrencies may use other cryptographic and/or hashing algorithms as part of their Proof-of-Work algorithm. For example, Litecoin and Dogecoin use the scrypt key-derivation function and Ethereum uses the Ethash algorithm. Thus, for embodiments of the miner 200 designed to mine such Altcoins, the compute boards 220 may include compute modules 222 designed to compute these other cryptographic algorithms.

The power supply 230 generally converts alternating current (AC) voltage to a direct current (DC) voltage suitable for the compute boards 220 and other components of the miner 200. In various embodiments, the power supply 230 receives 220V AC voltage from, for example, a wall mains outlet and efficiently converts the received power to one or more DC voltages distributed to various components of the miner 200. As shown, the power supply 230 may include a control power supply 232, one or more compute power supplies 234, as well as other power supplies. The control power supply 232 may supply control power (e.g., via one or more supplied DC voltages) used to power a control power domain of the compute boards 220. The one or more compute power supplies 234 may supply compute power (e.g., via one or more supplied DC voltages) used to power a compute power domain of the compute boards 220.

In various embodiments, the control power supply 232 and compute power supply 234 are selectively enabled via one or more signals of the miner controller 210. As such, the miner controller 210 may selectively enable/disable the power supplies 232, 234 so as to selectively power-up/power-down the respective power domains of the compute boards 220. For example, the miner controller 210 may power-up the control power domain of the compute boards 220 in order to configure and confirm operation of the compute boards 220 before powering-up the compute domain, which in certain embodiments consumes substantially more power than the control power domain.

The cooling system 240 generally comprises active thermal components (e.g., cooling fans, liquid cooling systems, Peltier cooling modules, etc.) that aid in maintaining the other components of the miner 200, especially the compute boards 220, within a thermal envelope associated with high operating efficiency. Beyond the active thermal components of the cooling system 240, the miner 200 may include other passive thermal components such as heat sinks, heat pipes, thermal paste, etc. that further aid in maintaining the components of the miner 200 within the desired thermal envelope.

In various embodiments, the miner controller 210 and compute modules 222 are coupled to one another via one or more busses (e.g., one or more SPI buses, I2C buses, etc.) Moreover, the miner controller and compute modules 222 may interact via master-slave protocols in which the miner controller 210 operates as the master and the compute modules 222 operate as slaves. To this end, the miner controller 210 may control the operation of the compute modules via commands issued over the one or more busses, which couple the compute modules 222 to the miner controller 210.

Figure 3:
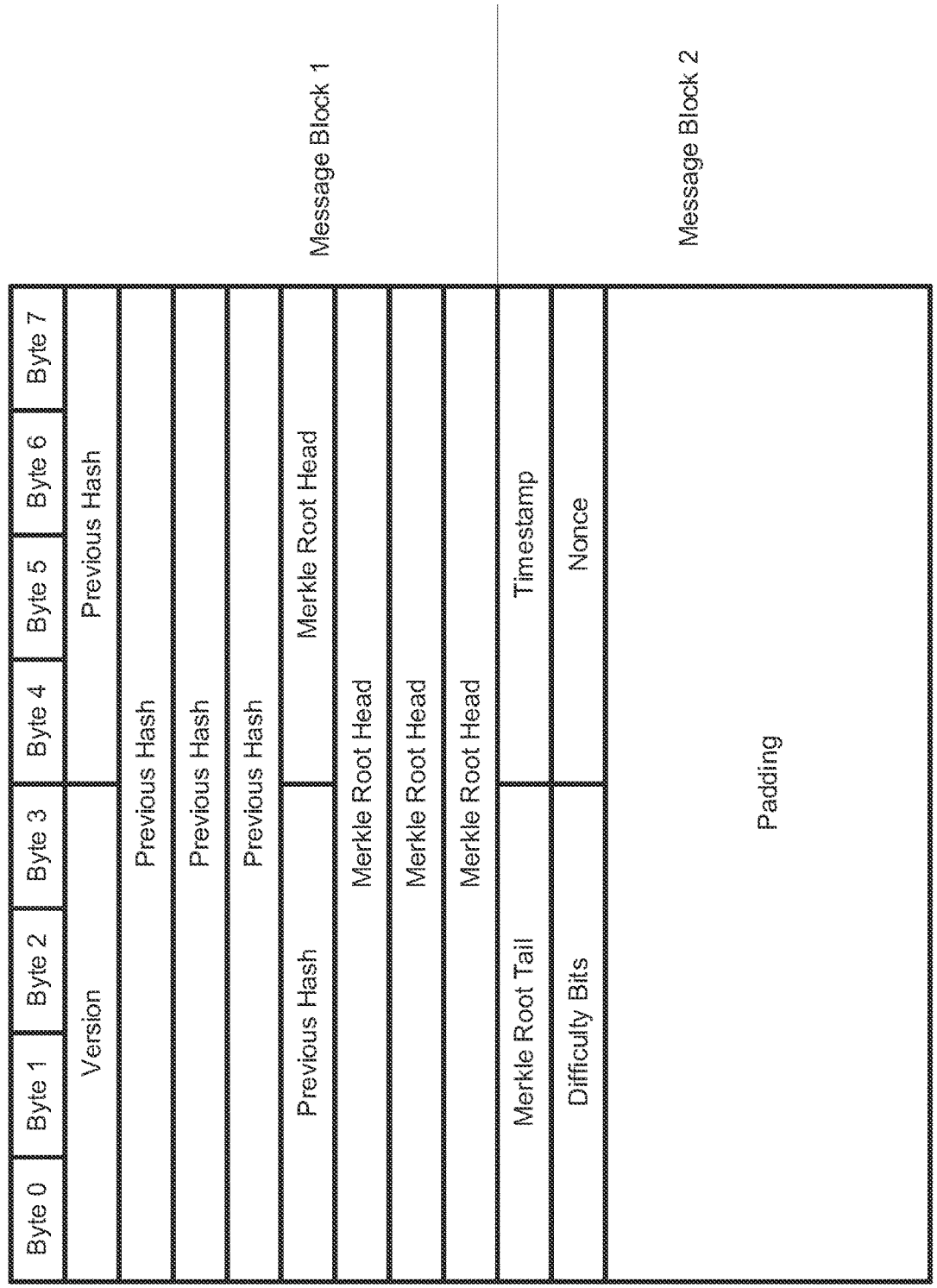
FIG. 3 depicts a message block header created by the miner of FIG. 2.

As noted above, a candidate block header must have a message digest or hash value that satisfies a current target value in order to add a block and its header to the blockchain. To better understand the search for such a valid block header, reference is made to the block header depicted in FIG. 3. As shown, the block header includes a first message block (Message Block 1) and a second message block (Message Block 1). Message Block 1 comprises a 32-bit version (Version) field, a 256-bit previous hash (Previous Hash) field, and 224-bit Merkle root head (Merkle Root Head) field. Message Block 2 comprises a 32-bit Merkle root tail (Merkle Root Tail) field, a 32-bit timestamp (Timestamp) field, a 32-bit difficulty (Difficulty) field, a 32-bit nonce (Nonce) field, and 384-bit padding (Padding) field.

The Version field may store a value that indicates which set of block validations apply to the block. The Previous Hash field may store a message digest or double SHA256 hash of the previous block in the blockchain. The Previous Hash field may ensure that no previous block in the blockchain may be changed without also changing the block header of the present block. The Merkle Root Head field and Merkle Root Tail field may collectively store a Merkle root value that spans Message Block 1 and Message Block 2. The Merkle root value is derived from a SHA256 hash of all transactions included in the block and may ensure that none of the transactions included in the block may be altered without altering the block header.

The Timestamp field may store a value that represents a time at which a miner claims to have started hashing the block header. The Difficulty field may store a value that represents the current target value for the message digest, namely the number of leading zeros that must exist in the message digest or SHA256 hash for a candidate block header to be a valid block header. The Nonce field may store a nonce value, which is a value that a miner may modify in search of a block header that produces a message digest with at least the leading number of zeros specified by the Difficulty field.

While a miner may alter the nonce value in the Nonce field in search of a valid block header, the range of values supported by the Nonce field may not be sufficient to find a block header that satisfies the target specified by the Difficulty field. As such, pool servers 132 and/or miners 134 may utilizes other aspects of the current block as extra nonce so as to achieve the target as described below.

Figure 4:
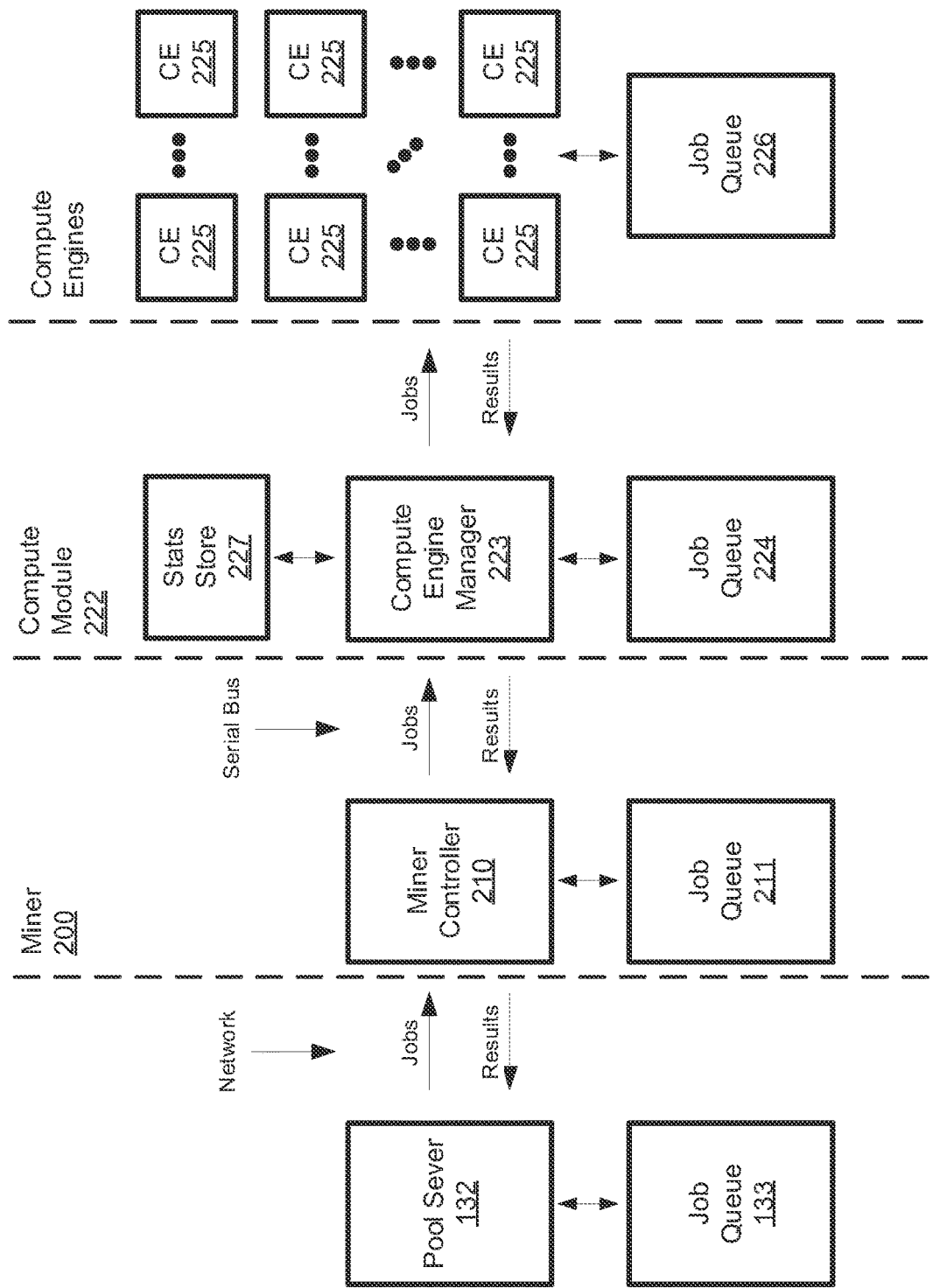
FIG. 4 depicts aspects of a compute module of FIG. 2 and a flow of jobs between layers of the cryptocurrency network of FIG. 1.
Figure 5:
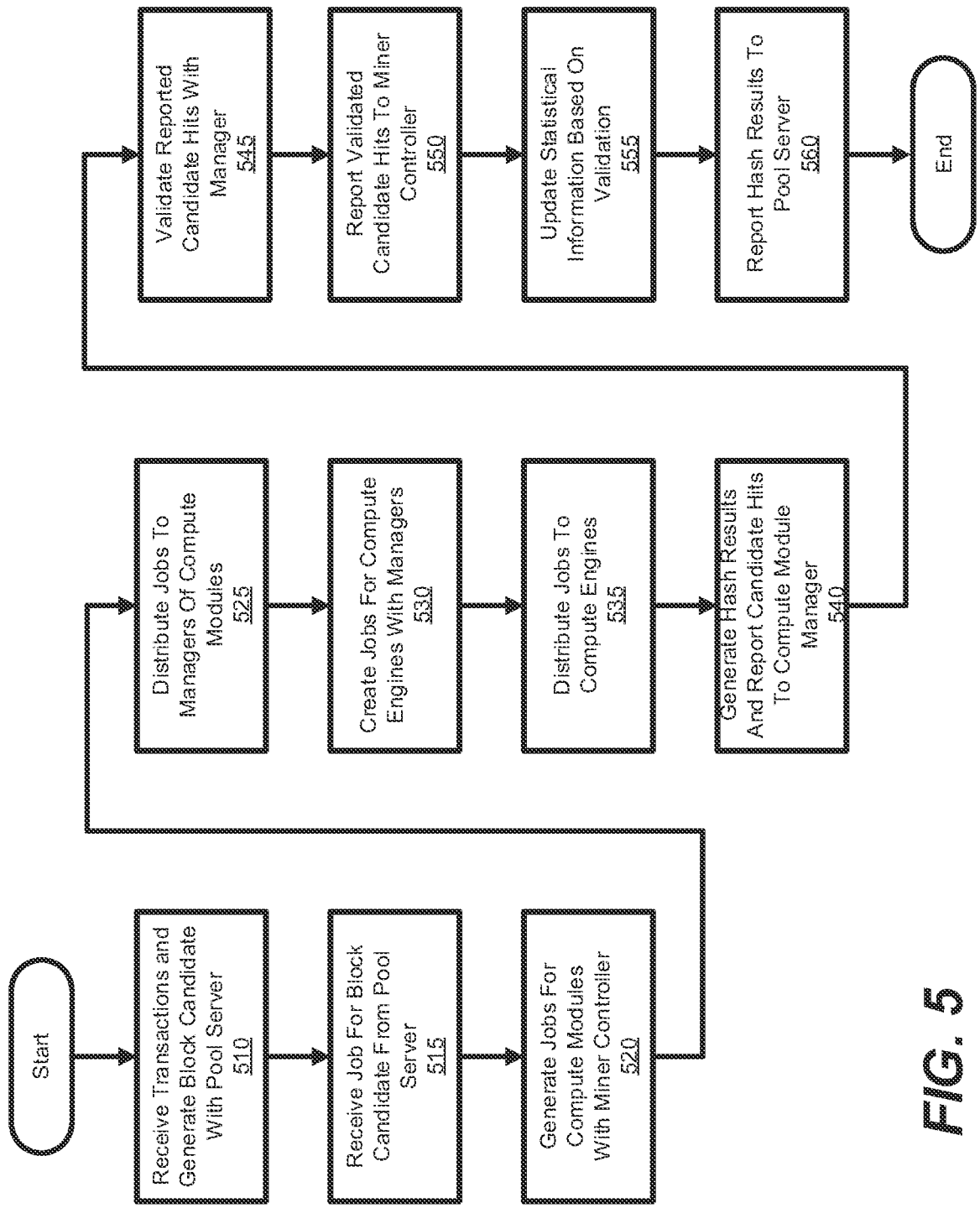
FIG. 5 depicts a flowchart for an example process of performing on-line statistical built-in self tests of the compute modules of the miner of FIG. 2.

FIGS. 4 and 5 depict a process of performing statistical built-in self tests of the compute modules 222. More specifically, FIG. 4 depicts additional aspects of compute module 222. Furthermore, FIG. 4 depicts a high-level flow of jobs from a pool server 134 to compute engines 225, job results and/or candidate hits from compute engines 225 to the pool server 134, and statistics generated and collected as a result of processing the jobs. FIG. 5 depicts a flowchart for an example process 500 of processing jobs and generating statistics from such processed jobs.

As shown in FIG. 4, the pool server 132 include a job queue 133. Per the job queue 133, the pool server 132 may maintain miner jobs and distribute such miner jobs to pool miners 134, which may be implemented per the miner 200 of FIG. 2. To this end, the pool server 132 may break a larger cryptocurrency job into smaller tasks or miner jobs to be distributed among the pool miners 134 in the pool. The pool server 132 may further store such miner jobs and information regarding such miner jobs in the job queue 133. Via such job queue 133, the pool server 132 may track which miner jobs have been processed, which miner jobs still need to be processed, and to which pool miner(s) 134 a particular miner job has been distributed. In various embodiments, the pool server 132 may maintain the job queue 133 as a database stored in memory and/or external storage devices of the pool server 132.

Similarly, the miner 200 may also include job queue 211. Per the job queue 211, the miner controller 210 may maintain module jobs and distribute such module jobs to compute modules 222 of the miner 200. To this end, the miner controller 210 may break a larger miner job into smaller tasks or module jobs to be distributed among the compute modules 222 of the miner 200. The miner controller 210 may further store such miner jobs in the job queue 211. Via such job queue 211, the miner controller 210 may track which module jobs are processed, which module jobs need to be processed, and to which compute module(s) 222 a particular module job has been distributed. In various embodiments, the miner controller 210 may maintain the job queue 211 as a database stored in memory 214.

As further shown, each compute module 222 may include a compute engine manager 223, a job queue 224, and a stats store 227. Similar to pool server 132 and miner controller 210 and their respective job queues 133, 211, the compute engine manager 223 may maintain engine jobs and distribute such engine jobs to compute engines 225 of the compute module 222. To this end, the compute engine manager 223 may break a larger module job into smaller tasks or engine jobs to be distributed among the compute engines 225 of the compute module 222. The compute engine manager 223 may further store such engine jobs in the job queue 224. Via such job queue 224, the compute engine manager 223 may track which engine jobs are processed, which engine jobs need to be processed, and to which compute engine(s) 225 a particular engine job has been distributed. In various embodiments, the compute engine manager 223 may maintain the job queue 224 in a register file and/or other local storage of the compute module 222.

Similarly, in various embodiment, the compute engines 225 may be associated with a respective job queue or queues 226 that store the received engine jobs till the compute engine 225 processes them. Such job queues 226 may be implemented via buffers, first-in-first-out (FIFO) queues, and/or other storage structures associated with a respective compute engine 225 or with respective compute engines 225.

Moreover, the compute engine manager 223 may validate job results and/or candidate hits received from the compute engines 225 as a result of processing their respective engine jobs. In various embodiments, operating parameters (e.g., operating frequency, operating voltage, operating current, etc.) of the compute engine manager 223 may be set to ensure that the compute engine manager 223 operates in a reliable and preferably error-free manner. Conversely, operating parameters (e.g., operating frequency, operating voltage, operating current, etc.) of the compute engines 225 may be set in a manner that places the compute engines 225 at or near their operating limits so as to compute results at a fast rate. However, the operational parameters, which place the compute engines 225 near their operating limits, may vary with time and operation of the compute engines 225. As such, a compute engine 225 may experience frequent computational errors if its operational parameters are not appropriately adjusted or tuned over the course of operation.

To this end, the compute engine manager 223 may maintain statistical information for the compute engines 225 in its stats store 227. For example, the compute engine manager 223 may recompute candidate hits reported by the compute engines 225 to determine whether the compute engine 225 correctly reported the candidate hit and update statistical information for the compute engines 225 accordingly. In this manner, the compute engine manager 223 may maintain hit rate information, error rate information, and/or other statistical information for the compute engines 225 during their normal course of operation.

The miner controller 210 may access such statistical information in order to take various remedial measures such as adjusting operating parameters of the compute module 222 and/or its compute engines 225, masking results of failing compute modules 222 and/or compute engines 225, powering off failing compute modules 22 and/or compute engines 225, etc. For example, the miner controller 210 may increase an operating frequency and/or adjust other operating parameters of one or more of the compute engines 225 if their respective error rate is below a threshold value. Conversely, the miner controller 210 may adjust the operating frequency and/or adjust other operating parameters of one or more of the compute engines 225 if their respective error rate is above a threshold value. Furthermore, the miner controller may adjust the operating frequency and/or adjust other operating parameters for one or more of the compute engines 225 if their respective hit rate is below a threshold value. A lower than expect hit rate may indicate that the compute engine 225 is experiencing false negatives and thus is failing to find candidate hits that are otherwise present.

Referring now to FIG. 5, an example method of processing jobs is shown. In particular, the pool server 132 at 510 may collect blockchain transactions from the cryptocurrency network 100, create a candidate block for the collected blockchain transaction, and queue the candidate block and associated transactions in its job queue 133. Moreover, the pool server 132 may break the job for the candidate block down to smaller tasks or miner jobs and distribute such miner jobs to the pool miners 134 in the pool. As such, the miner 200 of FIG. 2 may receive at 515 a miner job from the pool server 132. In particular, the miner controller 210 of the miner 200 may negotiate with the pool server 132 and receive a miner job from the job queue 133 of the pool server 132 based on a pre-negotiated extra nonce range and a pre-negotiated version range of the miner 200.

At 520, the miner controller 210 may break the received miner job into smaller tasks or module jobs for the compute modules 222 to process with regard to the candidate block. In various embodiments, the miner controller 210 may create such module jobs by manipulating an extra nonce value of the candidate block per the extra nonce range of the miner 200. In particular, the miner controller 210 may roll an extra nonce value in a coinbase transaction of the candidate block across the extra nonce range of the miner controller 210. In various embodiments, the miner controller 210 at 520 may further roll the version value across the version range of the miner 200 in order to create additional module jobs for the compute modules 222.

To account for rolling of the extra nonce value of the coinbase transaction, the miner controller 210 may further update the Merkle root value of a candidate block header. Since the Merkle root value is derived from a SHA256 hash of the transactions for the candidate block, changing the extra nonce value of a coinbase transaction changes the Merkle root value of the candidate block. In various embodiments, the miner controller 210 may associate a Merkel root tail value and a difficulty value with a message block identifier (MB_ID) for a candidate block header and store such association in its job queue 211. In this manner, each MB_ID may be associated with a candidate block header having a fixed Merkel root tail value and a fixed difficulty value.

At 525, the miner controller 210 may distribute the module jobs to the compute modules 222. To this end, the miner controller 210 may issue a Job Submit command which delivers one or more module jobs to one or more compute modules 222 via a serial bus interface between the miner controller 210 and compute modules 222. The Job Submit command may include one or more job elements that provide Merkle root tail values, timestamp values, difficulty values and other values that specify aspects of a candidate block for processing by a compute module 222 and its compute engines 225. The miner controller 210 may then issue a Job Submit command in order to deliver one or more module jobs to one or more targeted compute modules 222.

The compute module manager 223 of each compute module 222 at 530 may receive the issued Job Submit command via the serial bus and create engine jobs for its compute engines 225. In various embodiments, the Job Submit command may be directed to a single compute module 222 or may be directed to multiple compute modules 222. As such, while a compute module manager 223 may receive a Job Submit command, the compute module manager 223 may determine that the Job Submit command is not directed to it and thus may effectively ignore the Job Submit command and may not break the received module job into smaller tasks or engine jobs for its compute engines 225.

However, assuming the Job Submit command is directed to the compute module manager 223, the compute module manager 223 at 530 may create and queue engine jobs for its compute engines 225. To this end, the compute module manager 223 may create engine jobs based on parameters supplied by the Job Submit command and place the generated engine jobs in its job queue 224 until delivered to a compute engine 225. In various embodiments, the computer module manager 223 may create further engine jobs by rolling the timestamp value across a timestamp range.

At 535, the compute module manager 223 may distribute the jobs in its job queue 224 to compute engines 225 which may store the received jobs in a respective job queue(s) 226. In various embodiments, the computer module manager 223 may associate an engine index (EIdx) with each distributed job so that the compute module manager 223 may later retrieve the respective job details when a compute engine 225 reports a candidate hit.

Each compute engine 225 at 540 may process an engine job and report results to the compute module manager 223. In particular, a compute engine 225 may receive an engine job from the compute module manager 223 and store the job in a respective job queue 226 until ready to process the job. Moreover, each compute engine 225 may process a job by iterating over their configured Nonce range and calculating the message digest of the candidate block header specified by the engine job and the current nonce value. Further, if a compute engine 225 finds a message digest that meets the leading zeros criteria of the job, the compute engine 225 at 540 may report the share candidate or hit to the compute module manager 223. To this end, the compute engine 225 may provide the compute module manager 223 with its engine index (EIdx) and the respective nonce value of the candidate hit.

At 545, the compute module manager 223 may validate the received result and report a candidate hit to the miner controller 210 if the received result is valid. In particular, the compute module manager 223 may determine whether the candidate hit reported by the compute engine 225 corresponds to a message digest that meets the target leading number of zeros for the job. To this end, the compute module manager 223 may retrieve the job details from the job queue 224 based on the engine index (Eldx) reported by the compute engine 225 and may compute the message digest using the retrieved information and the reported nonce value. The compute module manager 223 may then determine whether the message digest it generated meets the target leading number of zeros for the job. If the message satisfies the target leading number of zeros (i.e., target difficulty), then the compute module manager 223 at 550 may report the candidate hit to the miner controller 210.

In various embodiments, the compute module manager 223 not only acts as a gate keeper which forwards job results to the miner controller 210 after confirming that the reported candidate hit satisfies the target difficulty for the job, but also updates at 555 statistical information stored in the stats store 227 of the compute module 222. As noted above, the miner controller 210 may read statistical information from the stats store 227 to monitor the operational health of the compute module 222 and its compute engines 225. In particular, the miner controller 210 may configure the compute modules 222 to operate at or near their respective performance edge under various operating conditions. At such performance edge, the compute engines 225 may be pushed to their limits so as to efficiently generate hash results. As a result, the compute engines 225 may experience an occasional miscalculation or if pushed too far may experience frequent miscalculations. Conversely, since the compute engines 225 compute many hash values before finding a target nonce that satisfies the target difficulty for the engine job, the compute module manager 223 may receive candidate hits from the compute engines 225 at a much slower rate than the rate at which the compute engines 225 generate hash results. As such, the compute module manager 223 may operate at a much slower rate in order to reliably validate the candidate hits reported by the compute engines 225.

Due to such slower rate, the compute module manager 223 may rarely if ever experience a miscalculation error when validating candidate hits of the compute engines 225. In this manner, the compute engines 225 may be pushed to or near their operational limits so as to generate candidate hits at a rate that is preferably as fast as possible and the compute module manager 223 may validate such results to ensure a miscalculation of the compute engines 225 is caught before being forwarded to the miner controller 210.

Moreover, the compute module manager 223 may update statistical information stored in the stats store 227. For example, the compute module manager 223 may maintain one or more of the following for each compute module 223:

Number of Hits Reported
  Number of Hits Correctly Reported
  Number of Hits Misreported
  Hit Rate (e.g., number of hits correctly reported per a second or some other time unit)
  Error Rate (e.g., number of hits incorrectly reported per a second or some other time unit)

In various embodiments, the compute module manager 223 may detect false positives, but not false negatives. Namely, when a compute engine 225 reports a candidate hit to the compute module manager 223, the compute module manager 223 may recompute the hash of the candidate block based on the nonce value reported by the compute engine 225 to determine whether the resultant hash has the requisite number of leading zeros for the engine job. If the resultant hash does not, then the compute module manager 223 has detected a false positive (i.e., a reported candidate hit that was incorrect). However, if a compute engine 225 should have reported a hit and did not, then the compute module manager 223 in various embodiments would not detect such a false negative since the compute module manager 223 validates or recomputes the hash for only the candidate hits reported by the compute engines 225.

Moreover, the compute module manager 223 may maintain and compute the statistical information in the stats store 227 during normal or on-line operation of the miner 200. As such, the stats store 227 may contain information regarding the operation of the compute module 222 during actual mining activities. Based on such statistical information which is reflective of true performance during mining activities, the miner controller 210 may take remedial measures. For example, during extended operation, the miner controller 210 may periodically monitor statistical information of each compute module 222 and adjust operating parameters of the miner 210 accordingly. To this end, the miner controller 210 may reduce the operating frequency of a compute module 222 and/or compute engine 225 experiencing an elevated error rate. Conversely, the miner controller may increase the operating frequency of a compute module 222 and/or compute engine 225 with an error rate below a threshold level.

At 560, the miner controller 210 may validate the received candidate hit and if validated may report to the pool server 132. In particular, the miner controller 210 may determine whether the result reported by the compute module manager 223 corresponds to a message digest that meets the difficulty value for the associated miner job. To this end, the miner controller 210 may retrieve the job details from the job queue 211 based on values provided by the compute module manager 223 and may compute the message digest using the retrieved information and the reported values. The compute module manager 223 may then determine whether the message digest it generated meets the difficulty value for the miner job. If the message digest satisfies the difficulty value for the miner job, the miner controller 210 may report the result back to the pool server 132.

In various embodiment, the miner controller 210 may configure the compute engines 225 and/or create the jobs for the compute engines 225 such that the leading zeros criteria used by the compute engines 225 is laxer than the difficulty value for the candidate block. Thus, candidate hits reported by the compute engines 225 may not satisfy the difficulty value of the job even if the compute engine 225 did not miscalculate the message digest. In this manner, the compute engines 225 may report candidate hits at a greater frequency than the compute engines 225 would if using the more stringent leading zeros criteria specified for the candidate block. Such higher reporting rates may be used to monitor the health of the compute engines 225 to ensure their proper operation. Moreover, the miner controller 210 may adjust the target leading zeros parameter used by a compute module 222 and/or respective compute engines 225 to adjust its respective hit rate and thus the rate statistical information is gathered. For example, the miner controller 210 may reduce the target leading zeros of a compute engine 225 as part of a tuning process in order to increase the rate it generates statistical information and in turn increase the rate the miner controller 210 is able to find suitable operating parameters for the compute engine 225.

While the foregoing has been described with reference to certain aspects and examples, those skilled in the art understand that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular examples disclosed, but that the disclosure includes all examples falling within the scope of the appended claims.

What is claimed is:

1. An integrated circuit device that provides a compute module for a cryptocurrency miner that includes a miner controller, the integrated circuit device comprising:
   a stats store;
   compute engines, each compute engine configured to process a job and report if processing its job generated a candidate hit; and
   a compute engine manager configured to:
      receive jobs from the miner controller of the cryptocurrency miner;
      distribute the jobs to the compute engines:
      validate candidate hits reported by the compute engines; and
      update statistical information in the stats store based on validation of the candidate hits reported by the compute engines.

2. The integrated circuit device of claim 1, wherein each compute engine is configured to compute a cryptographic hash in response to processing its job.

3. The integrated circuit device of claim 1, wherein each compute engine is configured to compute a cryptographic hash of a candidate block associated with the job.

4. The integrated circuit device of claim 1, wherein each compute engine is configured to compute a cryptographic hash for a candidate block and report a candidate hit if the cryptographic hash has at least a target number of leading zeros.

5. The integrated circuit device of claim 4, wherein the compute engine manager validates each reported candidate hit by recomputing the cryptographic hash for the candidate block and confirming the recomputed cryptographic hash has at least the target number of leading zeros.

6. The integrated circuit device of claim 1, wherein the compute engine manager operates at a slower frequency than the compute engines.

7. The integrated circuit device of claim 1, wherein the compute engine manager updates an error rate of the statistical information in response to determining that a candidate hit of the reported candidate hits was reported in error.

8. The integrated ciruit device of claim 1, wherein the compute engine manager updates an error rate for a first compute engine of the compute engines in response to determining that a candidate hit reported the first compute engine was an error.

9. The integrated ciruit device of claim 1, wherein the compute engine manager updates a candidate hit rate of the statistical information based on the candidate hits reported by the compute engines.

10. A cryptocurrency miner for use with a pool server, the cryptocurrency miner comprising:
    a network interface;
    a plurality of integrated circuit devices, wherein each integrated circuit device comprises a stats store, a compute engine manager, and compute engines; and
    a miner controller coupled to the plurality of integrated circuit devices via a bus;
    wherein the miner controller is configured to receive jobs from the pool server via the network interface, and distribute the jobs among the plurality of integrated circuit devices via the bus;
    wherein each compute engine manager of the plurality of integrated circuit devices is configured to distribute jobs received by its respective integrated circuit device among the compute engines of its respective integrated circuit device;
    wherein each compute engine of the plurality of integrated circuit devices is configured to process a job and report to the compute engine manager of the respective integrated circuit a candidate hit found by processing the job; and
    wherein each compute engine manager is configured to validate a candidate hit reported by one of the compute engines of its respective integrated circuit device, report the validated candidate hit to the miner controller; and update statistical information in the stats store of its respective integrated circuit device based on validation of the candidate hit.

11. The cryptocurrency miner of claim 10, wherein the miner controller is configured to adjust operating parameters of a first integrated circuit device of the plurality of integrated circuit devices based on the statistical information read from the stats store of the first integrated circuit device.

12. The cryptocurrency miner of claim 10, wherein:
    a first integrated circuit device of the plurality of integrated circuit devices comprises a first compute engine; and
    the miner controller is configured to adjust operating parameters of the first compute engine based on the statistical information read from the stats store of the first integrated circuit device.

13. The cryptocurrency miner of claim 10, wherein each compute engine of the plurality of integrated circuit devices is configured to compute a cryptographic hash for a candidate block and report a candidate hit to the compute engine manager of its respective integrated circuit device if the cryptographic hash has at least a target number of leading zeros.

14. The cryptocurrency miner of claim 10, wherein the miner controller is configured to increase a hit rate of a first integrated circuit device of the plurality of integrated circuit devices by reducing a target number of leading zeros used by a compute engine of the first integrated circuit device.

15. The cryptocurrency miner of claim 10, wherein:
    a first integrated circuit device of the plurality of integrated circuit devices is configured to compute a cryptographic hash for a candidate block and report a candidate hit to the compute engine manager of the first integrated circuit device if the cryptographic hash has at least a target number of leading zeros; and
    the miner controller is configured to receive the candidate hit from the compute engine manager of the first integrated circuit device, validate the candidate hit using a difficulty setting that has a greater number of leading zeros than the target number of leading zeros used by the first integrated circuit device.

16. A method of a cryptocurrency miner comprising a network interface, a miner controller, and a plurality of integrated circuit devices, the method comprising:
    receiving a miner job via the network interface;
    creating, with the miner controller from the received miner job, a plurality of compute module jobs for the plurality of integrated circuit devices;
    creating, with a first compute engine manager of a first integrated circuit device compute engine jobs for compute engines of the first integrated circuit device from a received compute module job of the plurality of compute module jobs;

processing a first compute engine job of the compute engine jobs with a first compute engine of the first integrated circuit device;

reporting, from the first compute engine to the first compute engine manager of the first integrated circuit device, a candidate hit found by the first compute engine processing the first compute engine job; and validating, with the first compute engine manager of the first integrated circuit device, the candidate hit reported by the first compute engine;

reporting, from the first compute engine manager of the first integrated circuit device to the miner controller, the candidate hit after determining that the candidate hit is valid; and updating, with the first compute engine manager, statistical information in a stats store of the first integrated circuit device based on validation of the candidate hit.

17. The method of claim 16, wherein processing the first compute engine job comprises computing a cryptographic hash of a candidate block associated with the first compute engine job.

18. The method of claim 17, comprising determining, with the first compute engine of the first integrated circuit device, that the cryptographic hash has at least a target number of leading zeros before reporting the candidate hit to the first compute engine manager of the first integrated circuit device.

19. The method of claim 18, wherein validating, with the first compute engine manager of the first integrated circuit device, comprises:

recomputing, with the first compute engine manager, the cryptographic hash for the candidate block; and confirming, with the first compute engine manager, the recomputed cryptographic hash has at least the target number of leading zeros.

20. The method of claim 19, wherein updating the statistical information comprises updating, with the first compute engine manager of the first integrated circuit device, an error rate of the statistical information in response to determining that the candidate hit was reported in error.

* * * * *